UNITED STATES PATENT OFFICE.

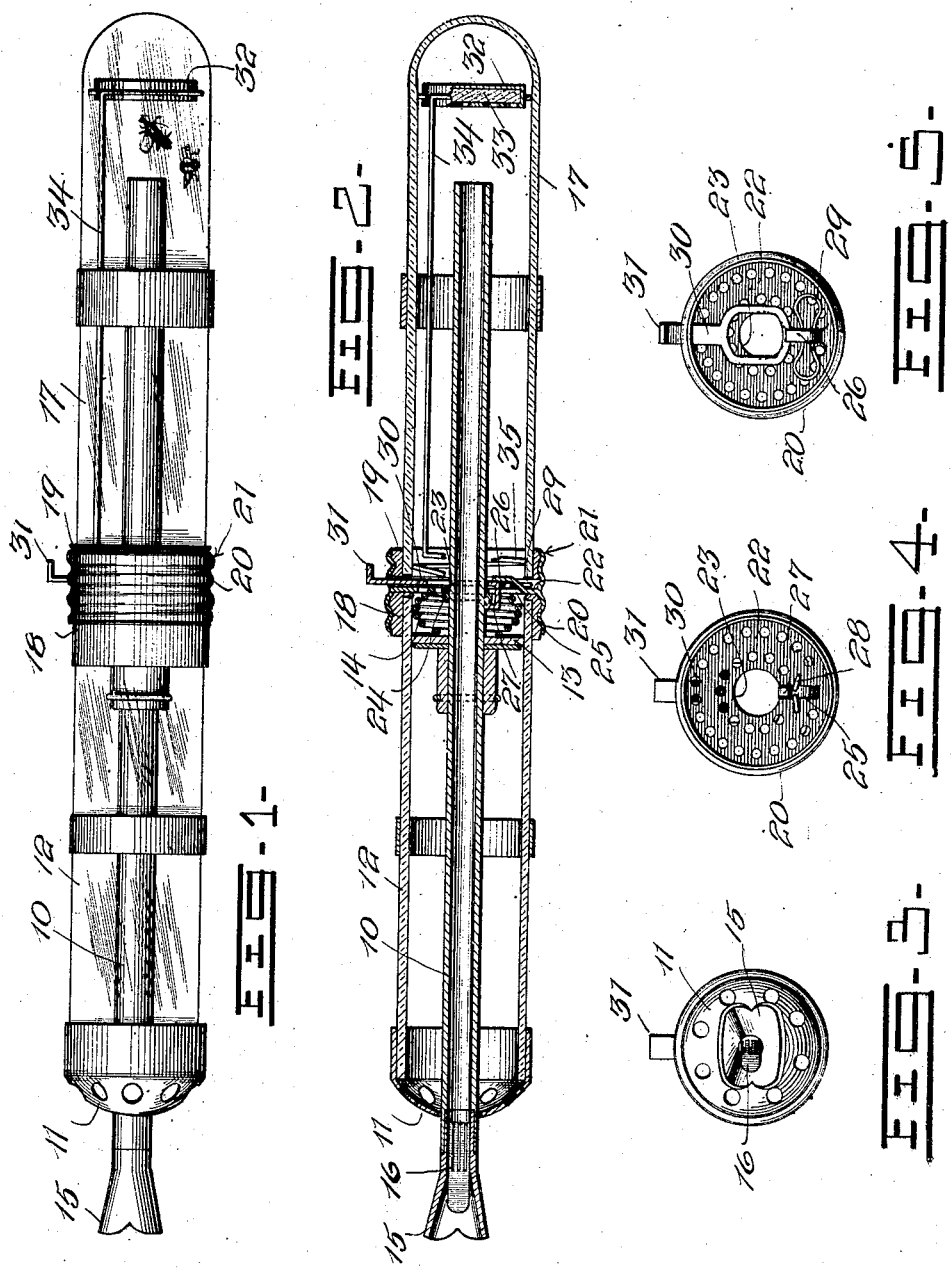

BENJAMIN R. JOLLY, OF RALEIGH, NORTH CAROLINA; THE RALEIGH SAVINGS BANK AND TRUST COMPANY EXECUTOR OF THE WILL OF SAID BENJAMIN R. JOLLY, DECEASED.

INSECT-CATCHER.

1,377,201. Specification of Letters Patent. Patented May 10, 1921.

Application filed July 29, 1919, Serial No. 314,016. Renewed June 29, 1920. Serial No. 392,775.

*To all whom it may concern:*

Be it known that I, BENJAMIN R. JOLLY, a citizen of the United States, and a resident of Raleigh, in the county of Wake and State of North Carolina, have made certain new and useful Improvements in Insect-Catchers, of which the following is a specification.

My present invention relates generally to insect catchers and more particularly to a mechanical suction trap, an object being the provision of a manually controlled and manipulated device by means of which flies, mosquitos and other small insects may be readily and easily caught, trapped and killed.

A further object is the provision of a simple, effective and practical form of mechanism or construction constituting an improvement especially with respect to my patent for a similarly operating device granted July 1, 1919, under Serial No. 1,308,497.

In the accompanying drawing, illustrating my present invention, and forming a part of this specification:

Figure 1 is a side elevation.

Fig. 2 is a longitudinal section.

Fig. 3 is an end view, and

Figs. 4 and 5 are elevations looking at relatively opposite sides of the central bearing and connecting member.

Referring now to these figures, a hollow piston rod 10, forming a trap tube, extends forwardly and outwardly through the perforate forward cap or end 11 of the forward section 12 of the holder. This section 12 is cylindrical as shown and forms a piston cylinder in which the piston 13 works forwardly under the force of a spring 14. As shown, the section 12 of the holder is formed of transparent material, *i. e.*, glass or the like or of gutta percha and the like, but it is to be understood that any material suitable for the purpose may be utilized and that transparency is not essential.

The outer forward end of the tubular rod 10 receives a suction mouth 15 in telescoping relation, preferably of the flattened bell-shape shown in Fig. 3 and this suction mouth preferably has an internal flexible member 16 which permits ingress and prevents egress of the insects. The rear end of the tubular rod 10 extends, and opens into the rear cylindrical section 17 of the holder which is similar to the forward section 12 in shape, its rear end being closed, and this section which forms the trap, is preferably formed of a suitable transparent material so that the insects, taken into the trap, may be seen.

The rear end of the forward section 12 and the forward end of the rear section 17 have similar threaded ferrules 18 and 19 to screw into the opposite annular threaded flanges 20 and 21 of a bearing and connecting plate or member 22 which extends between the said ends of the sections and which is perforated so that the piston 13 in its forward movement may create a suction in the holder section 17 and in the rod 10.

This plate 22 has a central opening 23, as seen particularly in Figs. 4 and 5, through which that portion of the tubular piston rod 10, rearwardly of its piston 13, works, and this piston rod has an annular rib 24 rearwardly of its piston 13 and adapted for engagement by a spring controlled manually actuated latch member supported by the plate 22.

To the above end, the plate 22 is provided with a slot 25 extending radially from its central opening 23 and formed by upsetting an integral strip 26 seen in Fig. 5, which is offset with respect to the rear face of plate 22 and forms between the same and the plate a guide channel for one end of a latch member 26 movable on the rear face of the plate 22. This end of the latch member has a laterally extending latch piece 27 engaged by the angularly bent ends 28 of a double bow spring 29 mounted beneath the guide strip 26 and the opposite end of the latch member has an extended arm 30 projecting exteriorly through a slot in the flange 21 and provided with an angular finger piece 31.

Thus when the tubular piston rod is thrust inwardly and rearwardly, compressing the spring 14 in the rear of its piston 13, as seen in Fig. 2, the annular rib 24 of the rod will be engaged by the latch piece 27 and the piston rod will be thus held in retracted position.

In utilizing the device with the parts held in retracted position, just as above described, the flaring outer end of the tube 10 is pointed toward the insect it is desired to catch and the finger piece 31 is pressed inwardly to shift the latch member 26 against the force of spring 29, moving the latch piece 27 free of engagement from the rib 24. In this way, the tubular piston rod 10 is released and the spring 14 then shifts the same in a forward direction and with a rapid movement, whereby the piston 13 in such forward movement will create a suction in the rear section 17 of the holder and thus in the tube 10. This suction operates to draw the insect into and through the tube and thus into the trap section 17 after which the tube 10 may be again shifted inwardly and rearwardly to latched position ready for another operation.

It is thus obvious that, as constructed my improved device admits of ready disassemblage of parts for the purpose of repair and substitution, as well as for cleaning and adjustment and that such construction admits of ready economical manufacture and promotes effectiveness in operation and an attractive appearance.

It is obvious that flies, mosquitos and other insects entrapped by my improved device, within the trap section 17, might live for some time and to avoid this, I preferably utilize means within the trap section to kill the insects. Such means may be of various forms, the one suggested and shown in Figs. 1 and 2 including a flat circular pad holder 32, one side of which is perforated as shown and the pad 33 of which may receive powdered or fluid insect exterminating material. This pad holder is supported upon one end of a stiff wire 34, the opposite end of which is coiled as shown at 35, so that the device is thus adapted to be extended within the trap section 17 and the pad holder will assume a position therein adjacent to its closed rear end, its coil 35 engaging the inner surface of the wall of the side section adjacent to its connected forward end, so that when it is removed from the bearing plate or member 22 the pad holder may be readily removed for re-filling purposes.

I claim:—

1. An insect catcher comprising an elongated tubular holder apertured at one end and closed at its opposite end, consisting of two cylindrical sections, one of which forms a piston cylinder and the other of which constitutes a trap, a perforated connecting member joining the adjacent ends of said sections, a tubular piston rod extending into the holder through its open end and also slidable through the connecting member, a piston on the rod in the first mentioned section of the holder, a spring around the rod and compressed between the piston and the said connecting member, relatively engaging means carried by the said rod and the connecting member, including a spring controlled manually shiftable latch member, the said inner end of the piston rod opening into the trap section, and a flaring suction mouth at the outer end of the piston rod as described.

2. An insect catcher comprising a cylindrical holder, including axially alined sections and a connecting member including a perforate wall between said sections, a hollow piston rod forming an intake tube and extending into one end of the holder and through the said connecting member, and opening at its inner end into one of the sections of the holder, a spring actuated piston secured to said rod and movable in the other section of the holder, and a manually releasable latch for holding the piston in retracted position.

3. An insect catcher comprising a cylindrical holder of approximately the same diameter throughout, including axially alined sections and a connecting member including a perforated wall between the adjacent ends of the sections, an intake tube extending through one end of the holder and through the said plate, and opening at its inner end into one of the sections of the holder, a spring actuated piston carried by the said tube and movable in the outer section of the holder, said tube having an annular rib inwardly beyond the said piston, a latch member slidably mounted on the said perforated plate and having an exteriorly projecting finger piece and an inner latch piece engageable with the rib, and a spring supported by the said perforated plate and normally engaging and controlling said latch member.

4. An insect catcher comprising a cylindrical holder, consisting of a pair of axially alined sections, a connecting member through which the said sections are in communication, including a perforated plate between the adjacent ends of the sections an intake tube extending forwardly from one end of the holder and through the said perforate plate and having its inner end opening into one of the sections of the holder, a piston on the tube in the other section of the holder, an annular latch rib carried by the tube adjacent to its piston, said perforate plate having an upset strip forming a slot, a spring supported beneath the said strip and having angularly bent ends extending through the said slot and a latch member slidable on one face of the said plate and having a portion guided between the plate and its said upset strip provided with an angular latch piece extending through the slot of the plate and against said angular ends of the said spring, the said latch member having an exteriorly projecting finger piece for the purpose described.

5. An insect catcher comprising a cylindrical holder in two axially alined sections, removably connected, one of said sections forming a piston cylinder and the other section forming a trap, a tubular intake rod extending inwardly through one end of the holder and through the piston section, and opening at its inner end into the trap section, a piston secured on the said tube within the first mentioned section of the holder, a spring in the piston section engaging the piston to actuate the same and the said tube and a latch normally holding the tube in retracted position, and supporting the spring under compression.

BENJAMIN R. JOLLY.